United States Patent
Singh et al.

(10) Patent No.: US 9,749,915 B2
(45) Date of Patent: Aug. 29, 2017

(54) AVOIDING CONFLICTS BETWEEN DEVICE-INITIATED HANDOVERS AND NETWORK-INITIATED HANDOVERS

(71) Applicant: Apple Inc., Cupertino, CA (US)

(72) Inventors: Ajoy K. Singh, Milpitas, CA (US); Wen Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 80 days.

(21) Appl. No.: 14/607,815

(22) Filed: Jan. 28, 2015

(65) Prior Publication Data

US 2016/0219474 A1   Jul. 28, 2016

(51) Int. Cl.
*H04W 36/04* (2009.01)
*H04W 36/00* (2009.01)

(52) U.S. Cl.
CPC .... *H04W 36/0083* (2013.01); *H04W 36/0022* (2013.01)

(58) Field of Classification Search
None
See application file for complete search history.

(56) References Cited

U.S. PATENT DOCUMENTS

| | | | | |
|---|---|---|---|---|
| 2010/0124172 A1* | 5/2010 | Tenny | | H04W 24/08 370/242 |
| 2011/0319072 A1* | 12/2011 | Ekici | | H04W 48/18 455/426.1 |
| 2014/0126544 A1* | 5/2014 | Khay-Ibbat | | H04W 36/30 370/332 |

OTHER PUBLICATIONS

3rd Generation Partnership Project; Technical Specification Group Services and System Aspects;Single Radio Voice Call Continuity (SRVCC); Dec. 2014, 69 pages; 3GPP TS 23.216 V12.2.0; 3GPP; France.
"3rd Generation Partnership Project; Technical Specification Group Radio Access Network; Evolved Universal Terrestrial Radio Access (E-UTRA); Radio Resource Control (RRC); Protocol specification"; Dec. 2014; 410 pages; 3GPP TS 36.331 V12.4.1; 3GPP; France.

* cited by examiner

*Primary Examiner* — Kouroush Mohebbi
(74) *Attorney, Agent, or Firm* — Meyertons Hood Kivlin Kowert & Goetzel, P.C.; Jeffrey C. Hood; Michael B. Davis

(57) ABSTRACT

In some embodiments, a user equipment device (UE) implements techniques for avoiding conflicts between UE-initiated and network-initiated handovers. In one embodiment, one or more first radios are configured to perform cellular communication using different first and second cellular radio access technologies (RATs) and a second radio is configured to perform wireless communication using a short-range RAT. In one embodiment, the mobile device is configured to, while communicating using the first cellular RAT, in response to determining that an inter-RAT handover to the short-range RAT is likely to be initiated or has been initiated by the at least one processor, delay sending a measurement report to the cellular base station. This delay may avoid conflict between handovers initiated by the network in response to the measurement report (e.g., from the first cellular RAT to the second cellular RAT) and the inter-RAT handover.

20 Claims, 10 Drawing Sheets

AVOIDING CONFLICTS BETWEEN DEVICE-INITIATED HANDOVERS AND NETWORK-INITIATED HANDOVERS

FIELD

The present application relates to wireless communication, and more particularly, to techniques relating to handovers between different radio access technologies.

DESCRIPTION OF THE RELATED ART

Wireless communication systems are rapidly growing in usage. Further, wireless communication technology has evolved from voice-only communications to also include the transmission of data, such as Internet and multimedia content.

Expanding traffic on mobile networks has increased the need for mobile data offloading, wherein a mobile device may access carrier-provided services originally targeted for cellular networks over an alternative wireless network, such as Wi-Fi, one type of wireless local area network (WLAN). One form of mobile data offloading uses the I-WLAN (Interworking Wireless LAN) or SMOG (S2b Mobility based on GTP) architecture to supply carrier-provided services to the mobile device over Wi-Fi. These carrier-provided services may include VVM (Visual VoiceMail), MMS (Multimedia Messaging Service), SMS (Short Messaging Service) and IMS (IP Multimedia Subsystem).

Thus, a user equipment device (UE), which may also be referred to as a mobile device, may communicate using different radio access technologies (e.g., different cellular RATs and/or WLANs) at different times. In various situations, the UE and/or the network may initiate handover between different wireless technologies based on various criteria. For example, consider a situation in which a UE is being used for a voice over LTE (VoLTE) phone call outside a residence and the user steps inside. At this point, the signal strength of the LTE connection may drop (e.g., because of the roof and walls of the residence) and the signal strength of a Wi-Fi connection may increase (e.g., because the user is closer to a Wi-Fi access point). In response, the UE may initiate a handover from VoLTE to Wi-Fi while the network may initiate a handover from VoLTE to another cellular RAT (e.g., a circuit-switched cellular RAT). A race condition may occur between the handovers and the call may be dropped. Similar race conditions may occur in various other scenarios for various RATs. Therefore, techniques for avoiding data loss or dropped calls on handover are desired.

SUMMARY

Embodiments are presented herein of, inter alia, a user equipment device (UE) and techniques which enable a UE to avoid conflicts between UE-initiated handovers and network-initiated handovers.

One embodiment relates to a mobile device comprising at least one antenna, one or more first radios, a second radio, and at least one processor coupled to the radios. In this embodiment, the one or more first radios are configured to perform cellular communication using different first and second cellular radio access technologies (RATs). In this embodiment, the second radio is configured to perform wireless communication using a short-range RAT. In this embodiment, the one or more processors and the radios are configured to perform voice and/or data communications, as well as various methods described herein.

In this embodiment, the mobile device is configured to, while communicating using the first cellular RAT, in response to determining that an inter-RAT handover to the short-range RAT is likely to be initiated or has been initiated by the at least one processor, delay sending a measurement report to the cellular base station. In this embodiment, the measurement report is usable by the cellular base station to initiate a handover from the first cellular RAT to the second cellular RAT. This delay may avoid conflict between handovers initiated by the network and the inter-RAT handover initiated by the mobile device.

Another embodiment relates to a mobile device comprising at least one antenna, one or more first radios and a second radio, and at least one processor coupled to the radios. In this embodiment, the one or more first radios are configured to perform cellular communication using different first and second cellular radio access technologies (RATs). In this embodiment, the second radio is configured to perform wireless communication using a short-range RAT. In this embodiment, the one or more processors and the radios are configured to perform voice and/or data communications, as well as various methods described herein.

In this embodiment, the mobile device is configured to, while communicating using the first cellular RAT, in response to determining that a handover to the second cellular RAT is likely to be initiated or has been initiated by a network that includes the cellular base station, delay triggering a handover to the short-range RAT. This delay may avoid conflict between the handover to the second cellular RAT and handovers initiated by the UE.

Yet another embodiment relates to a non-transitory computer-readable medium having instructions stored thereon that that are executable by a computing device to perform various operations. In this embodiment, the operations include communicating via a cellular base station using a first cellular radio access technology (RAT), determining that an inter-RAT handover from the first cellular RAT to a short-range RAT is likely to be initiated or has been initiated, and delaying sending a measurement report to the base station. In this embodiment, the measurement report is usable by the cellular base station to initiate a handover from the first cellular RAT to a second cellular RAT. The delaying may avoid conflict between handovers initiated by the network and the inter-RAT handover.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
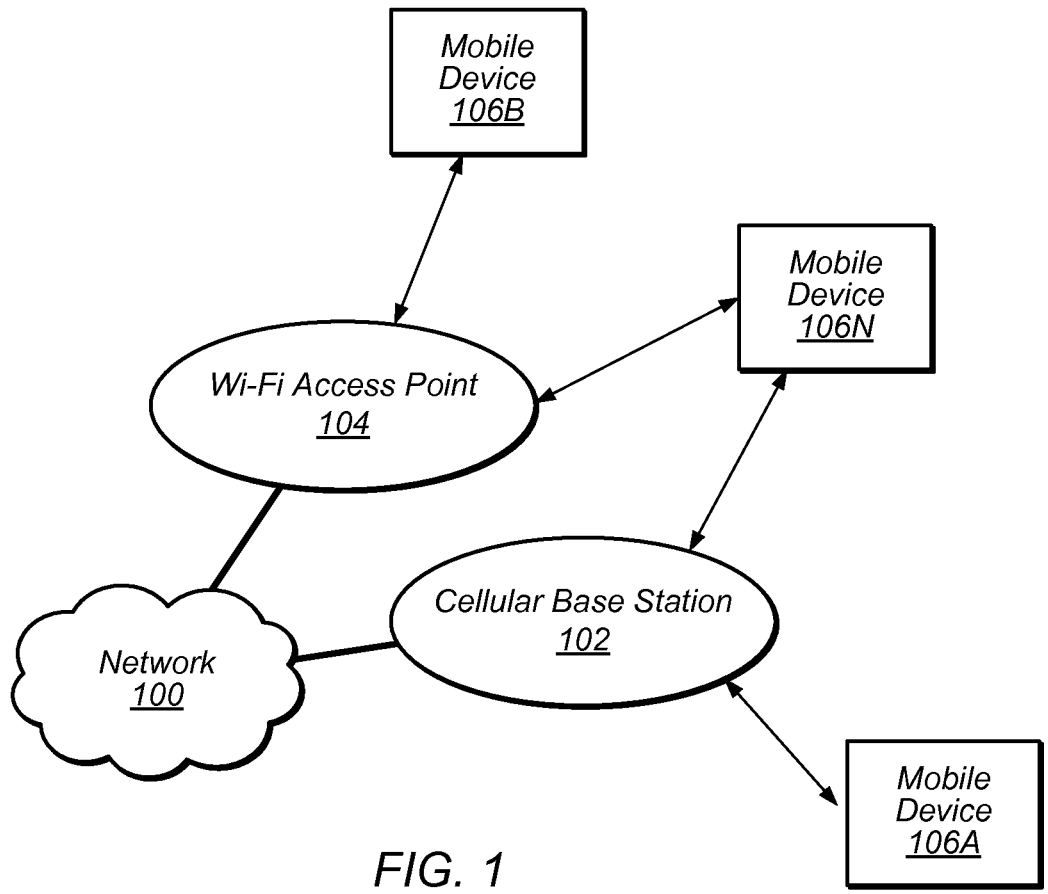
FIG. 1 illustrates an exemplary (and simplified) wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

This disclosure initially lists relevant acronyms and a glossary. It then describes, with reference to FIGS. 1A-6, exemplary embodiments of a mobile device configured to communicate via different radio access technologies (RATs). Exemplary handovers from cellular to Wi-Fi and between different cellular RATs are described with reference to FIGS. 7-9. Exemplary methods for avoiding conflicts between handovers are described with reference to FIGS. 10-12. Various techniques described herein may avoid race conditions between UE-initiated handovers and network-initiated handovers, in some embodiments.

ACRONYMS

The following acronyms are used in the present disclosure.

BS: Base Station
AP: Access Point
APN: Access Point Name
LTE: Long Term Evolution
VoLTE: Voice over LTE
VOIP: Voice Over IP
IMS: IP Multimedia Subsystem
MO: Mobile Originated
MT: Mobile Terminated
RAT: Radio Access Technology
TX: Transmit
RX: Receive
WLAN: Wireless Local Area Network
I-WLAN: Interworking WLAN
SIP: Session Initiation Protocol
PDN: Packet Data Network
PGW: PDN Gateway
SGW: Serving Gateway
P-CSCF: Proxy Call Session Control Function
ePDG: evolved Packet Data Gateway
IFOM: IP Flow Mobility
SMOG: S2b Mobility based on GTP
GTP: GPRS Tunneling Protocol
GPRS: General Packet Radio Service

GLOSSARY

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Mobile Device—any of various types of communication devices which are mobile and are capable of communicating on a cellular network and a non-cellular network, such as Wi-Fi. A UE is an example of a mobile device.

Base Station—The term "Base Station" has the full breadth of its ordinary meaning, and at least includes a wireless communication station installed at a fixed location and used to communicate as part of a wireless cellular telephone system or cellular radio system.

Access Point—The term "Access Point" has the full breadth of its ordinary meaning, and at least includes a wireless communication device which offers connectivity to a wireless local area network (WLAN), such as a Wi-Fi network.

Wi-Fi—The term "Wi-Fi" has the full breadth of its ordinary meaning, and at least includes a wireless local area network technology based on the IEEE (Institute of Electrical and Electronics Engineers) 802.11 standards, and future revisions or enhancements to those standards.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
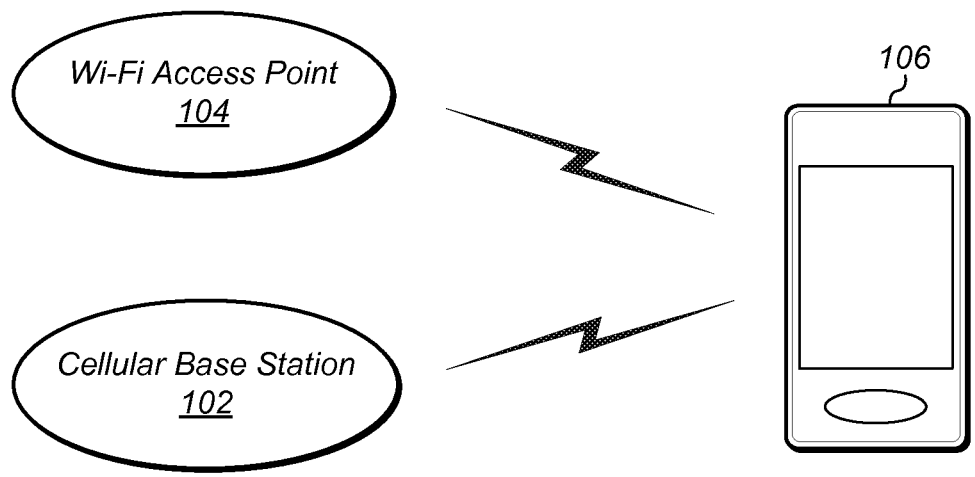
FIG. 2 illustrates a mobile device in communication with a cellular base station and an access point (AP)

FIGS. 1 and 2—Communication System

FIG. 1 illustrates an exemplary (and simplified) wireless communication system. It is noted that the system of FIG. 1 is merely one example of a possible system, and disclosed embodiments may be implemented in any of various systems, as desired.

As shown, the example wireless communication system includes a cellular base station 102 which may communicate over a transmission medium with one or more example, a "user equipment device" (UE) or other types of devices as defined above.

The base station 102 may be a base transceiver station (BTS) or cell site, and may include hardware that enables wireless cellular communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the mobile devices and/or between the mobile devices and the network 100.

The communication area (or coverage area) of the base station may be referred to as a "cell." The base station 102 and the UEs 106 may be configured to communicate over the transmission medium using any of various cellular radio access technologies (RATs), also referred to as wireless cellular communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc. A typical wireless cellular communication system will include a plurality of cellular base stations which provide different coverage areas or cells, with handoffs between cells.

Additionally, the example wireless communication system may include one or more wireless access points (such as access point 104) which may be communicatively coupled to the network 100. Each wireless access point 104 may provide a wireless local area network (WLAN) for communication with mobile devices 106. These wireless access points may comprise Wi-Fi access points. Wireless access point 104 may be configured to support cellular network offloading and/or otherwise provide wireless communication services as part of the wireless communication system illustrated in FIG. 1.

Cellular base station 102 and other similar base stations, as well as access points (such as access point 104) operating according to a different wireless communication standard (e.g., Wi-Fi), may thus be provided as a network which may provide continuous or nearly continuous overlapping service to mobile devices 106 and similar devices over a wide geographic area via one or more wireless communication standards.

Thus, while base station 102 may act as a "serving cell" for a UE 106 as illustrated in FIG. 1, each mobile device 106 may also be capable of receiving signals from (and possibly within communication range of) one or more other cells (which might be provided by other base stations (not shown) and/or wireless local area network (WLAN) access points, which may be referred to as "neighboring cells" or "neighboring WLANs" (e.g., as appropriate), and/or more generally as "neighbors".

FIG. 2 illustrates mobile device 106 (e.g., one of the devices 106A through 106N) in communication with both a Wi-Fi access point 104 and a cellular base station 102. The mobile device 106 may be a device with both cellular communication capability and non-cellular communication capability, e.g., Wi-Fi capability, such as a mobile phone, a hand-held device, a computer or a tablet, a wearable device, or virtually any type of wireless device.

The mobile device 106 may include a processor that is configured to execute program instructions stored in memory. The mobile device 106 may perform any of the method embodiments described herein by executing such stored instructions. Alternatively, or in addition, the mobile device 106 may include a programmable hardware element such as an FPGA (field-programmable gate array) that is configured to perform any of the method embodiments described herein, or any portion of any of the method embodiments described herein.

In some embodiments, the mobile device 106 may be configured to communicate using any of multiple radio access technologies/wireless communication protocols. For example, the mobile device 106 may be configured to communicate using any of various cellular communication technologies, such as GSM, UMTS, CDMA2000, LTE, LTE-A, etc. The mobile device may also be configured to communicate using any of various non-cellular communication technologies such as WLAN/Wi-Fi, or GNSS. Other combinations of wireless communication technologies are also possible.

The mobile device 106 may include one or more antennas for communicating using one or more wireless communication protocols or technologies. In one embodiment, the mobile device 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers etc.), or digital processing circuitry (e.g., for digital modulation as well as other digital processing). Similarly, the radio may implement one or more receive and transmit chains using the aforementioned hardware. For example, the mobile device 106 may share one or more parts of receive and/or transmit chains between multiple wireless communication technologies, such as those discussed above.

In some embodiments, the mobile device 106 may include separate transmit and/or receive chains (e.g., including separate RF and/or digital radio components) for each wireless communication protocol with which it is configured to communicate. As a further possibility, the mobile device 106 may include one or more radios which are shared between multiple wireless communication protocols, and one or more radios which are used exclusively by a single wireless communication protocol. For example, the mobile device 106 might include a shared radio for communicating using either of LTE or 1×RTT (or LTE or GSM), and separate radios for communicating using each of Wi-Fi and Bluetooth. Other configurations are also possible.

Figure 3:
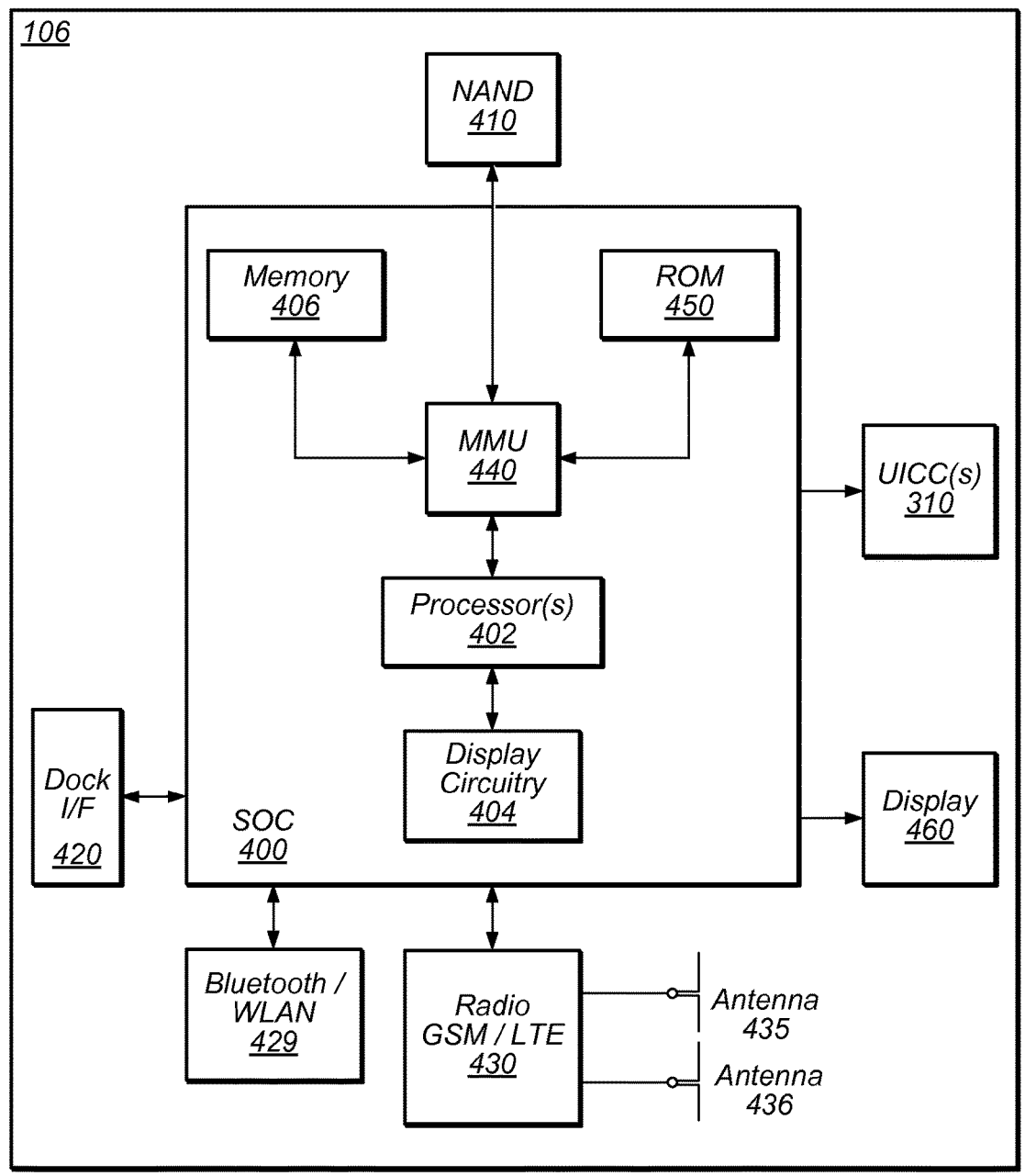
FIG. 3 illustrates an example block diagram of a mobile device.

FIG. 3—Mobile Device Block Diagram

FIG. 3 illustrates an example simplified block diagram of a mobile device 106. As shown, the mobile device 106 may include a system on chip (SOC) 400, which may include portions for various purposes. The SOC 400 may be coupled to various other circuits of the mobile device 106. For example, the mobile device 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Bluetooth™ and WLAN circuitry). The mobile device 106 may further comprise one or more smart cards 310 that comprise SIM (Subscriber Identity Module) functionality, such as one or more UICC(s) (Universal Integrated Circuit Card(s)) cards 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the mobile device 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

In one embodiment, as noted above, the mobile device 106 comprises at least one smart card 310, such as a UICC 310, which executes one or more Subscriber Identity Module (SIM) applications and/or otherwise implement SIM functionality. The at least one smart card 310 may be only a single smart card 310, or the mobile device 106 may comprise two or more smart cards 310. Each smart card 310 may be embedded, e.g., may be soldered onto a circuit board in the mobile device 106, or each smart card 310 may be implemented as a removable smart card, an electronic SIM (eSIM) or any combination thereof. Any of various other SIM configurations are also contemplated.

As noted above, the mobile device 106 may be configured to communicate wirelessly using multiple radio access technologies (RATs). The mobile device 106 may be configured to communicate according to a Wi-Fi RAT and/or one or more cellular RATs, e.g., such as communicating on both Wi-Fi and cellular at the same time. For example, the mobile device 106 may be communicating on a primary communication channel (such as Wi-Fi), and in response to detected degradation of the primary communication channel may establish a secondary communication channel (such as on cellular). The mobile device 106 may operate to dynamically establish and/or remove different primary and/or secondary communication channels as needed, e.g., to provide the best user experience while attempting to minimize cost.

As described herein, the mobile device 106 may include hardware and software components for implementing the features and methods described herein. The processor 402 of the mobile device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the mobile device 106, in conjunction with one or more of the other components 400, 404, 406, 410, 420, 430, 435, 440, 450, 460 may be configured to implement part or all of the features described herein.

Figure 4:
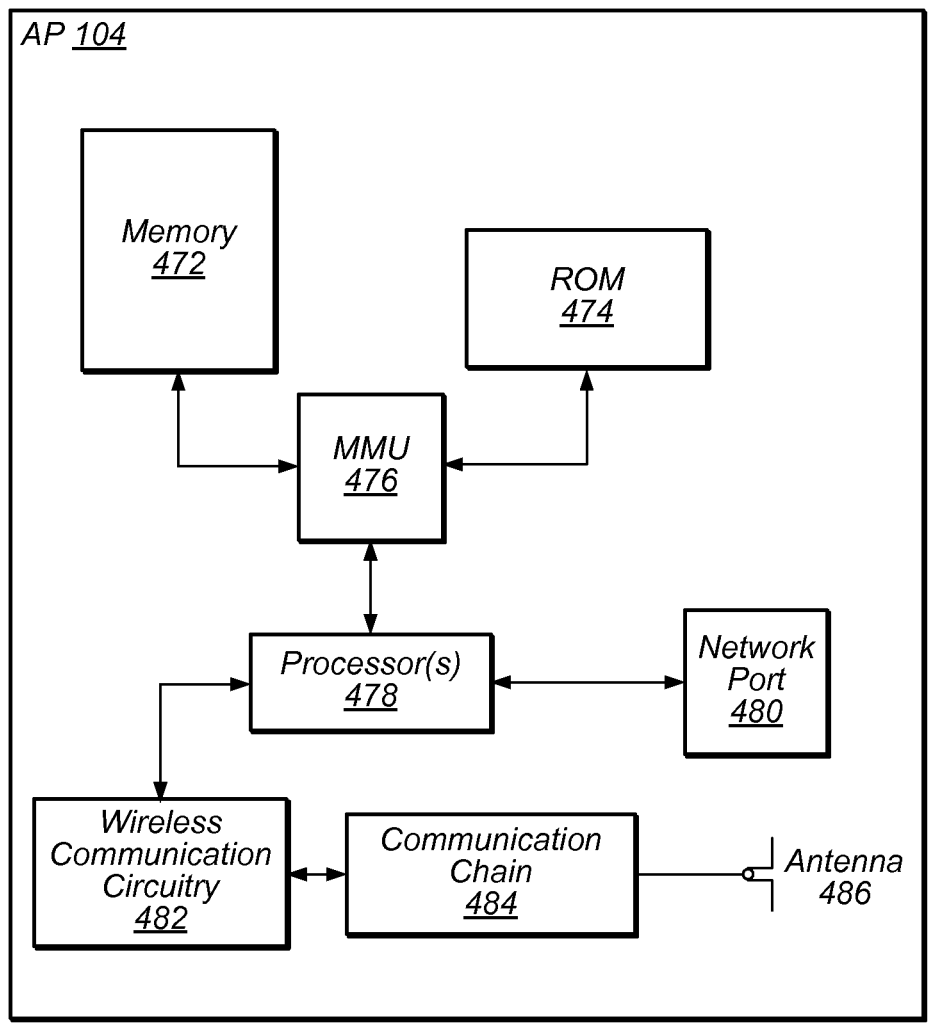
FIG. 4 illustrates an example block diagram of an access point.

FIG. 4—Access Point Block Diagram

FIG. 4 illustrates an example block diagram of an access point 104. It is noted that the access point 104 of FIG. 4 is merely one example of a possible access point. As shown, the access point 104 may include processor(s) 478 which may execute program instructions for the base station 102. The processor(s) 478 may also be coupled to memory management unit (MMU) 476, which may be configured to receive addresses from the processor(s) 478 and translate those addresses to locations in memory (e.g., memory 472 and read only memory (ROM) 474) or to other circuits or devices.

The access point 104 may include at least one network port 480. The network port 480 may be configured to couple to a network, such as the Internet, and provide a plurality of devices, such as mobile devices 106, access to the network as described above in FIGS. 1 and 2.

The network port 480 (or an additional network port) may also be configured to couple to a cellular network, e.g., a core network of a cellular service provider. The core network may provide mobility related services and/or other services to a plurality of devices, such as mobile devices 106. In some cases, the network port 480 may couple to a telephone network via the core network, and/or the core network may provide a telephone network (e.g., among other mobile devices serviced by the cellular service provider).

The access point 104 may include at least one antenna 486, and possibly multiple antennas. The at least one antenna 486 may be configured to operate as a wireless transceiver and may be further configured to communicate with mobile devices 106 via wireless communication circuitry 482. The antenna 486 communicates with the wireless communication circuitry 482 via communication chain 484. Communication chain 484 may be a receive chain, a transmit chain or both. The wireless communication circuitry 482 and the communication chain 484 may compose a radio. The radio may be configured to communicate via various wireless local area network standards, including, but not limited to Wi-Fi.

Cellular base station 102 may also be described according to the block diagram of FIG. 4, except that communication may be performed using any of various cellular communication technologies.

Figure 5:
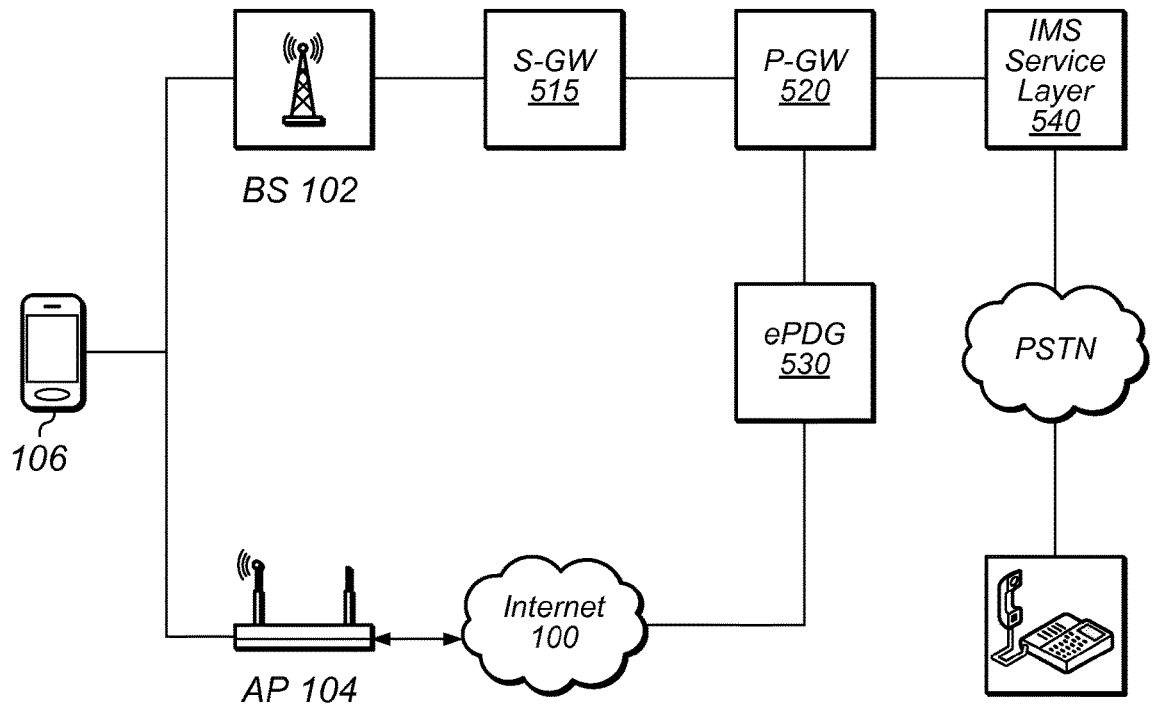
FIG. 5 is a block diagram of an example communication system.

FIG. 5—Example Wireless Communication System

FIG. 5 illustrates an example wireless communication system according to one embodiment. As shown, the mobile device 106 may communicate with a cellular network via cellular base station (BS) 102. The cellular base station 102 may communicate with a Serving Gateway (SGW) 515. In some embodiments, the SGW 515 is responsible for handovers with neighboring base stations. In the illustrated embodiment, SGW 515 couples to a Packet Data Network (PDN) Gateway, or (PGW) 520. As shown, evolved Packet Data Gateway (ePDG) 530 operates to interface between the cellular and Wi-Fi networks. PGW 520 assigns device IP addresses of the iWLAN tunnel interface and the cellular interface. Together ePDG 530, SGW 515 and PGW 520 make up the evolved packet core (EPC).

As shown, mobile device 106 may also communicate with a Wi-Fi access point (AP) 104, where the Wi-Fi access point presents a Wi-Fi network. The Wi-Fi access point 104 may couple through a network, such as the Internet, to the evolved Packet Data Gateway (ePDG) 530. The ePDG 530 is utilized in the network function of 4G mobile core networks, known as the evolved packet core (EPC) mentioned above, as well as future mobile networks, such as 5G networks. As noted above, the ePDG 530 may act as an interface between the EPC and non-3GPP networks that may use secure access, such as Wi-Fi and femtocell access networks.

The PGW may function as an inter-RAT mobility anchor. The PGW 520 may couple to an IMS (IP Multimedia Subsystem) server. The IMS server may comprise a computer system with a processor and memory which performs various operations as described herein. The IMS server may implement an IMS Service Layer 540. The IMS server may also implement a Proxy Call Session Control Function (P-CSCF). The P-CSCF may act as the entry point to the IMS domain and may serve as the outbound proxy server for the mobile device. The mobile device may attach to the P-CSCF prior to performing IMS registrations and initiating SIP sessions. The P-CSCF may be in the home domain of the IMS operator, or it may be in the visiting domain where the mobile device is currently roaming.

The IMS server may couple to other networks such as the public switched telephone network (PSTN) or other types of communication networks, e.g., for communicating with other communication devices, such as a standard POTS telephone (shown), another mobile device, etc.

Figure 6:
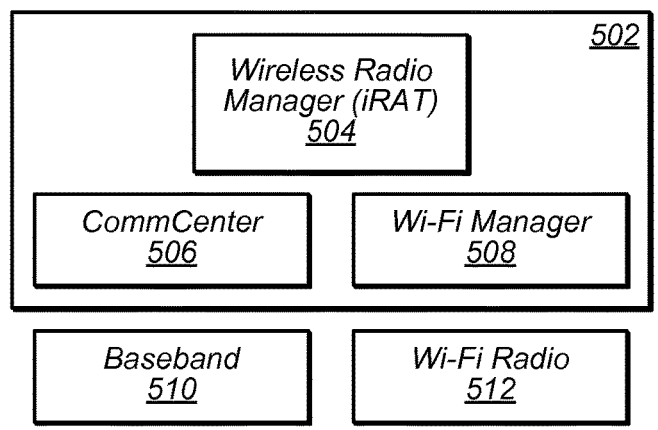
FIG. 6 illustrates various communication components present in one embodiment of the mobile device.

FIG. 6—Mobile Device Functionality

FIG. 6 illustrates example functionality that may be present in the mobile device 106. As shown, the mobile device 106 may comprise a RAT block 502 that comprises a wireless radio manager 504, a communication center (CommCenter) block 506, and a Wi-Fi manager block 508. The wireless radio manager 504 may be configured to receive various metrics from the communication center block 506 and/or the Wi-Fi manager block 508 and determine whether to use one or more of available cellular and Wi-Fi connections based on the statistics. In one embodiment, the communication block 506 may manage or control baseband logic 510 (e.g., related to cellular communication)

and Wi-Fi manager block 508 may manage or control Wi-Fi radio 512. Although not shown, the RAT block 502 may include a symptoms manager that may report current connection information (e.g., connection metrics or statistics) to the wireless radio manager 504. Elements of the RAT block 502 may be implemented as software or firmware executable by a processor.

Figure 7:
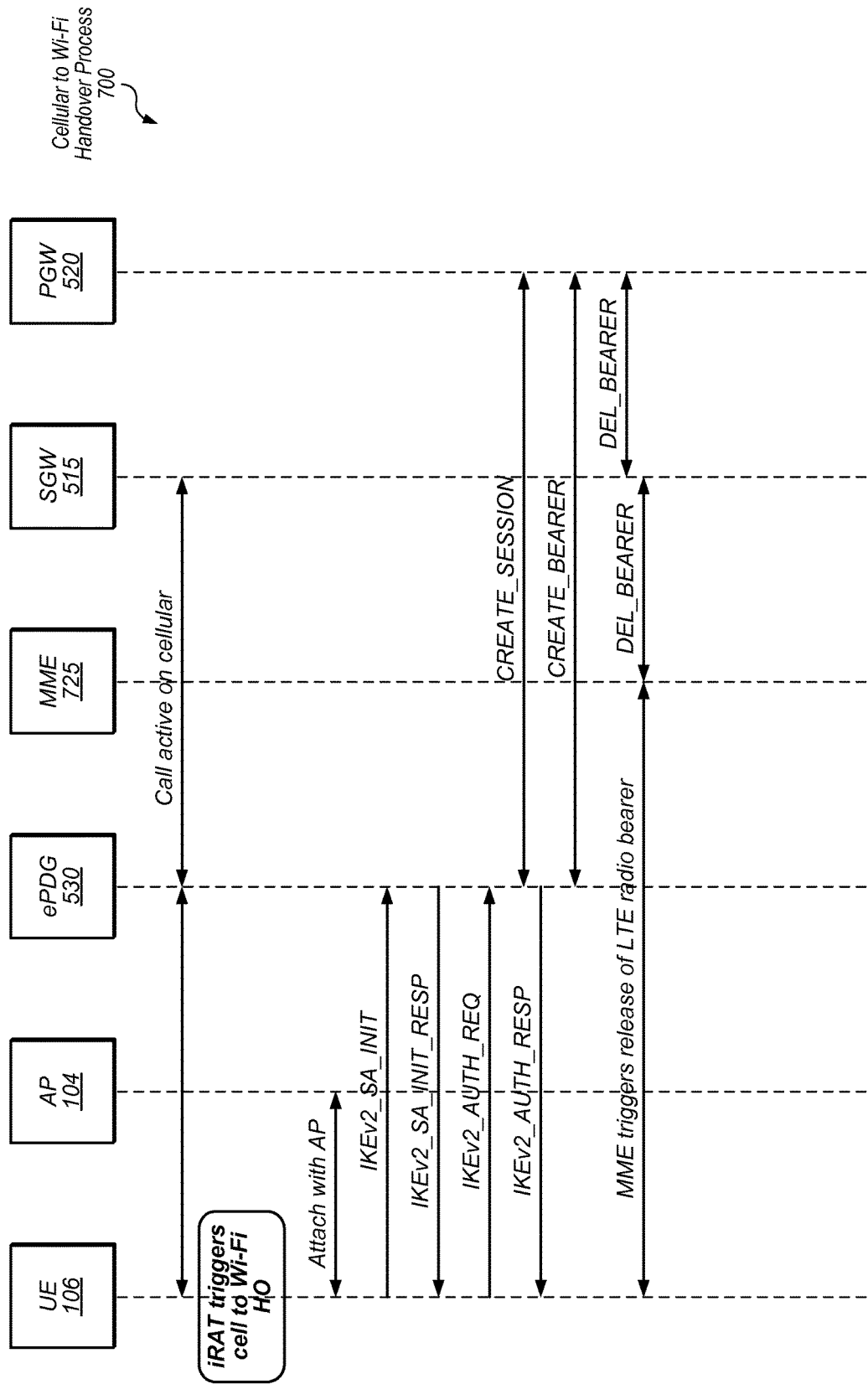
FIG. 7 illustrates one embodiment of a cellular to Wi-Fi handover, which is one example of a UE-initiated handover process.

FIG. 7—Exemplary UE-Initiated Cellular to Wi-Fi Handover

FIG. 7 is a communication diagram that illustrates an exemplary (and simplified) cellular to Wi-Fi handover process 700. As shown, this process may be trigged by UE 106 (iRAT manager 504 initiates the handover in the illustrated example). Initially, a call for UE 106 is active on a cellular network, via SGW 515. For example, the call may be a VoLTE call utilizing IMS.

Subsequently, iRAT manager 504 triggers a cellular to Wi-Fi handover. As discussed above, iRAT manager 504 may trigger the handover based on various metrics or criteria. In some embodiments, RAT block 502 is configured to determine and track various metrics for cellular and/or Wi-Fi communications. For example, RAT block 502 (such as in baseband logic 510) may maintain cellular information including: reference signal received power (RSRP), signal to noise ratio (SNR), MAC hybrid automatic repeat request (HARM) packet loss, Packet Data Convergence Protocol (PDCP) discard, and/or radio link control (RLC) packet loss, etc. RAT Block 502 (such as in RAT manager 504) may use various sets of these metrics to determine the quality of a cellular connection. Similarly, RAT Block 502 (such as in Wi-Fi Manager 508) may maintain Wi-Fi information including: received signal strength indicator (RSSI), SNR, transmit packet error rate (TX PER), and/or receive (RX) PER, etc. RAT Block 502 (such as in RAT manager 504) may use various sets of these metrics to determine the quality of a Wi-Fi connection. Based on this information, iRAT manager 504 may be configured to initiate handovers from cellular to Wi-Fi and vice versa. For example, iRAT manager 504 may initiate a handover to Wi-Fi when it determines that a stable Wi-Fi connection has been established with good signal strength and that the cellular connection quality is low.

In this illustrated example, the UE attaches with AP 104 (this may occur before or after triggering of the handover). Subsequently, in the illustrated embodiment UE 106 sends an Internet Key Exchange (IKE) message IKEv2_SA_INIT to ePDG 530 and receives an IKEv2_SA_INIT_RESP response to secure exchange of IKEv2_AUTH message, which is subsequently exchanged. A session and bearer are created between ePDG 530 and PGW 520 for Wi-Fi communication, and the LTE radio bearer is deleted (as triggered by MIME 725 in the illustrated embodiment based on signals from PGW 520 and SGW 515).

The handover illustrated in FIG. 7 is shown for exemplary purposes and is not intended to limit the scope of inter-RAT handovers in various embodiments. Also, FIG. 7 is a simplified diagram that shows details of particular messages in the core network, various additional messages may be included in such a handover. In various embodiments, a UE may trigger handovers in the other direction (e.g., from Wi-Fi to cellular), between other RATs, etc.

Figure 8:
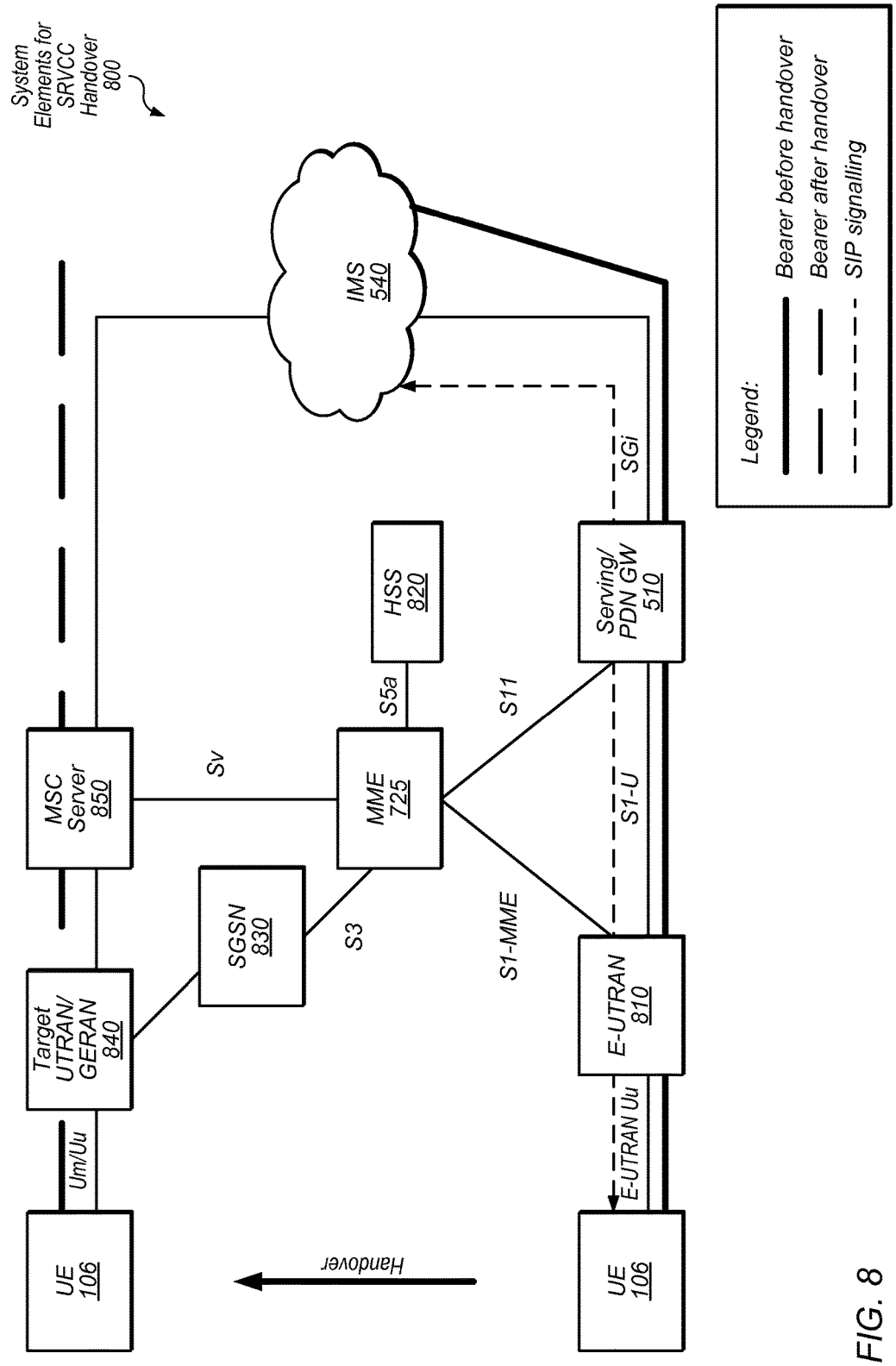
FIGS. 8 and 9 illustrate one embodiment of a cellular to cellular handover, which is one example of a network-initiated handover process.
Figure 9:
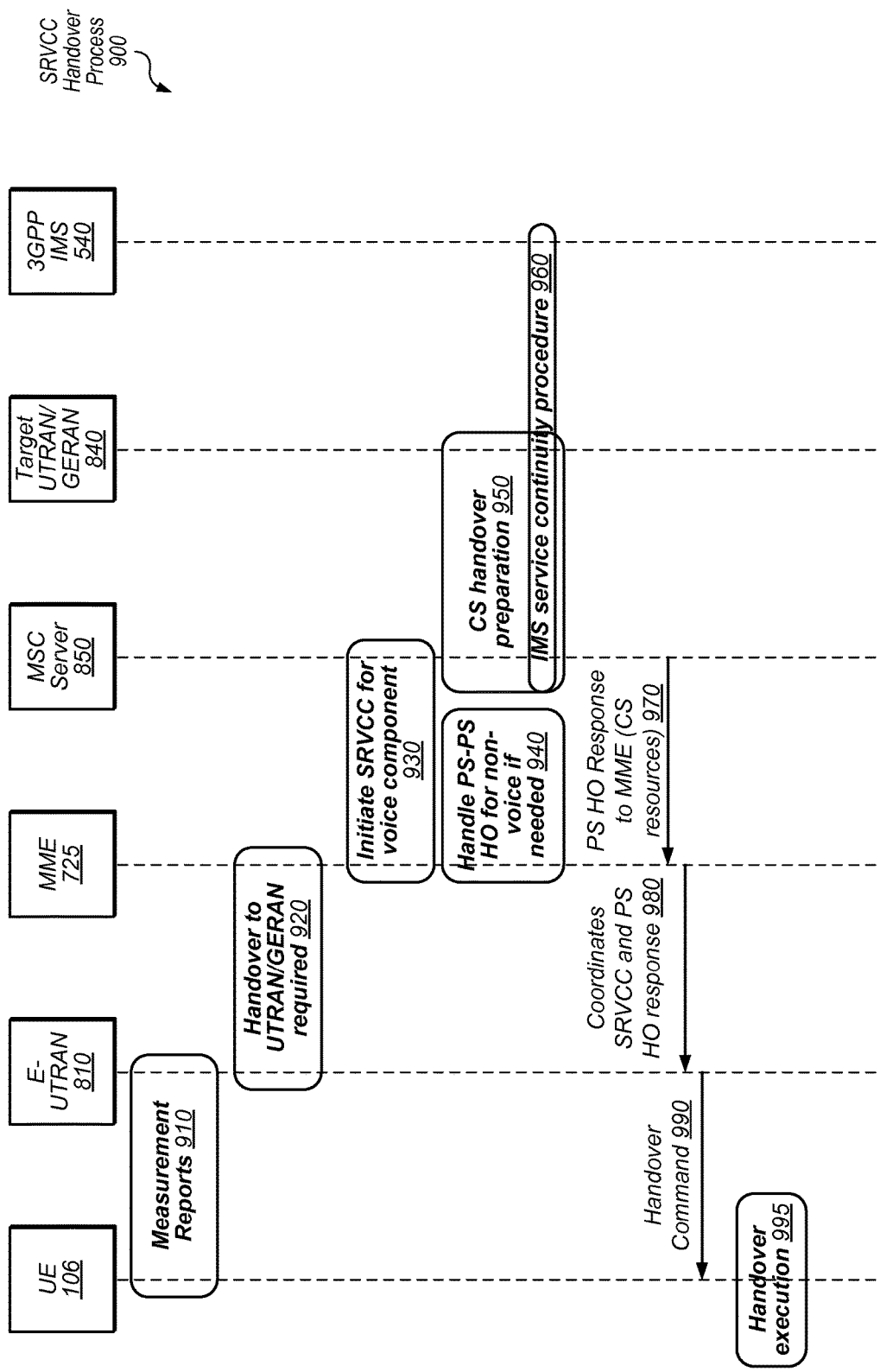

FIGS. 8-9—Exemplary Network-Initiated SRVCC Handover

FIG. 8 illustrates system elements 800 for an exemplary single radio-voice call continuity (SRVCC) handover (which is one example of a network-initiated handover from one cellular communications technology to another). FIG. 8 is based on FIG. 4.2.2-1 in 3GPP TS 23.216 V12.2.0 (2014-12), which is incorporated by reference herein in its entirety. FIG. 9, discussed in further detail below, is a communications diagram for the handover. FIG. 9 is based on FIG. 5.2.1-1 in 3GPP TS 23.216. In the illustrated embodiment, a packet-switched (PS) communication via evolved UMTS Terrestrial Radio Access (E-UTRAN) 810 is handed over to a circuit-switched (CS) communication via a target UMTS Terrestrial Radio Access (UTRAN)/GSM EDGE Radio Access Network (GERAN) 840.

In the illustrated embodiment, an E-UTRAN bearer (illustrated using the bold solid line) over IMS is used for a call (e.g., a VoLTE call) using serving/packet data network (PDN) GW 520 and mobility management entity (MME) 725. The dashed line with relatively shorter dashes illustrates session initiation protocol (SIP) signaling for IMS for this call. After the handover, a UTRAN/GERAN bearer (shown using the bold dashed line with relatively longer dashes) is used for the call via mobile switching center (MSC) server 850. In the illustrated embodiment, MME 725 is coupled to MSC server 850 via the Sv interface, to serving GPRS support node (SGSN) 830 via the S3 interface, to home subscriber server (HSS) 820 via the S5a interface, to PGW 520 via the S11 interface, and to E-UTRAN 810 via the S1-MME interface. MSC server may be configured to perform various actions to facilitate switching to a CS protocol and may receive tunneled messages from UE 106 via MME 725. In the illustrated embodiment serving GPRS support node (SGSN) 830 is communicatively coupled between target UTRAN/GERAN 840 and MME 725. In the illustrated embodiment, PGW 510 is coupled to IMS service layer 540 via the SGi interface. The SRVCC handover process is described in further detail below with reference to FIG. 9.

FIG. 9 is a communication diagram illustrating an exemplary SRVCC handover process 900. In the illustrated embodiment, UE 106 sends one or more measurement reports 910 to E-UTRAN 810. A measurement report may be event-triggered or periodic and may include various types of information from UE 106.

Exemplary events that may trigger a measurement report are discussed in 3GPP 36.331 V12.4.1 (2014-12), which is incorporated by reference herein in its entirety at section 5.5.4. These events may be based on various different signal quality measurements and/or parameters (such as threshold parameters and/or hysteresis parameters, for example). Exemplary measurements include reference signal received power (RSRP), reference signal received quality (RSRQ), and received signal code power (RSCP). A base station may configure (e.g., using RRC messages) a specific measurement type that a UE is expected to report. Exemplary events based on intra-RAT measurements and parameters include: a serving cell measurement becomes better or worse than a threshold, a neighbor cell measurement becomes better or worse than a threshold, a primary cell measurement becomes worse than a threshold and a neighbor measurement becomes better than a second threshold, a neighbor cell measurement becomes some offset better than the serving cell measurement, etc.

Exemplary events based on inter-RAT measurements and parameters include: an inter-RAT neighbor measurement becomes better than a threshold, a primary cell measurement becomes worse than a threshold and an inter-RAT neighbor measurement becomes better than a threshold, etc. In some embodiments, baseband logic 510 may determine that a measurement report triggered based on inter-RAT measurements is likely to trigger an SRVCC handover.

E-UTRAN 810 may specify what information should be included in a measurement report, in some embodiments. Exemplary measurement report information includes: what cells the UE can detect, signal strength for various cells, current channel conditions, UE memory buffer, antenna information, number of supported simultaneous transmission streams, data acknowledgements, various information determined by RAT block 502 as described above, etc.

In response to data in the measurement reports, in the illustrated embodiment E-UTRAN 810 signals to MME 725 that a handover to a target UTRAN/GERAN network is required 920. In response, in the illustrated embodiment, MME 725 initiates an SRVCC for voice component 930 and handles a packet-switched to packet-switched (PS-PS) handover for non-voice communications if needed 940. In response, in the illustrated embodiment, MSC server 850 prepares the circuit-switched (CS) handover 950 and performs an IMS service continuity procedure 960. Subsequently, in the illustrated embodiment, MSC server 850 sends PS handover response to MME 725 via transmission 970. In response, in the illustrated embodiment, MME 725 coordinates SRVCC and PS handover response 980. In response, in the illustrated embodiment, E-UTRAN 810 transmits handover command 990 to UE 106 and the handover is subsequently executed 995.

Thus, FIGS. 8-9 illustrate an exemplary SRVCC handover from a PS cellular RAT to a CS cellular RAT. The handover illustrated in FIGS. 8-9 is shown for exemplary purposes and is not intended to limit the scope of inter-cellular-RAT handovers in various embodiments. In various embodiments, a network may trigger handovers in the other direction (e.g., from CS to PS), between other cellular RATs, etc.

FIGS. 10-11—Exemplary Techniques for Avoiding Handover Race Conditions

As discussed above, one or more potential race conditions may exist between UE-initiated RAT handovers and network-initiated RAT handovers. For example, if UE 106 initiates the cellular to Wi-Fi handover process of FIG. 7 when E-UTRAN 810 has already initiated the SRVCC handover of FIGS. 8-9 (or vice versa), various unexpected events may occur. Communications may be interrupted, e.g., a voice call may be dropped. The techniques discussed below with reference to the various exemplary embodiments illustrated in FIGS. 10-11 may avoid these potential race conditions.

FIGS. 10-11 illustrate exemplary methods performed by baseband logic 510 and iRAT manager 504. In the illustrated embodiments, these are separate processing elements, but in other embodiments the disclosed functionality may be performed by a single processing element (in this case, various notification/receipt steps described herein may be replaced by determinations made by the single processing element).

Figure 10A:
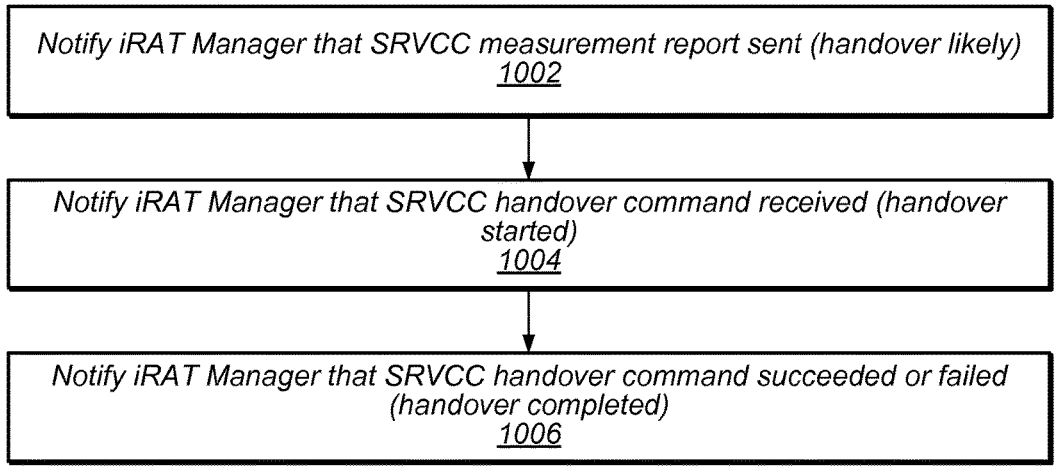
FIGS. 10A-10C illustrate exemplary methods performed by one embodiment of a baseband processing element configured to perform cellular functions.
Figure 10B:
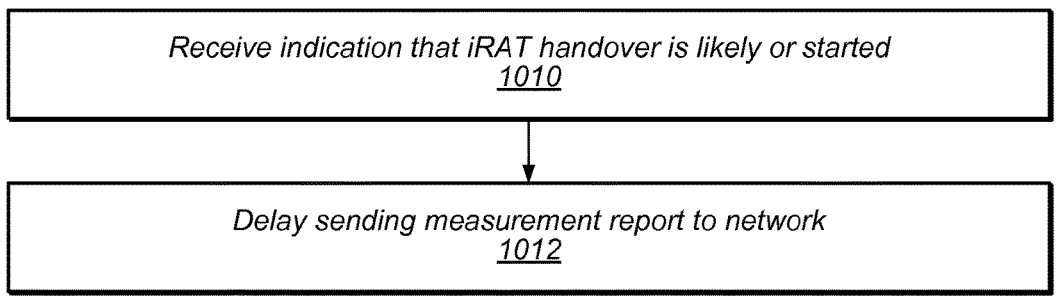
Figure 10C:
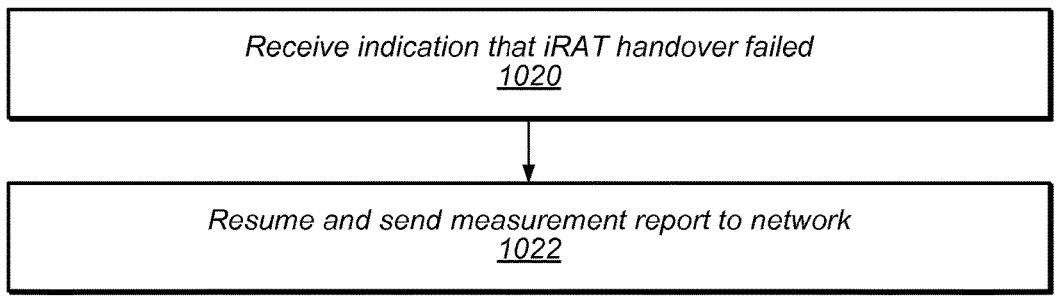

FIGS. 10A-C are flow diagrams illustrating exemplary embodiments of methods performed by baseband logic 510. The methods shown in FIGS. 10A-C may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

Referring now to FIG. 10A, one embodiment of a method for sending notifications regarding a network-initiated handover is shown. At 1002, baseband logic 510 notifies iRAT manager 504 that a network-initiated handover is likely. In the illustrated embodiment, baseband logic 510 is configured to send this notification based on determining that a measurement report has been sent to the network. In some embodiments, baseband logic 510 is configured to analyze the contents or type of the measurement report and notify iRAT manager 504 that a handover is likely only if the contents or type of the measurement report is likely to cause the network to trigger a handover.

At 1004, baseband logic 510 notifies iRAT manager 504 that the handover has started. In the illustrated embodiment, this is based on a determination that the SRVCC handover command has been received.

At 1006, baseband logic 510 notifies iRAT manager 504 that the network-initiated handover is complete. In the illustrated embodiment, this is based on a determination that the SRVCC handover command succeeded or failed.

In some embodiments, one or more of the "notify" steps of FIG. 10A are replaced with steps including determining the various disclosed information, e.g., when the techniques of FIGS. 10-11 are performed by a single processing element.

Referring now to FIG. 10B, one embodiment of a method for avoiding a race condition is shown. At 1010, baseband logic receives an indication from iRAT manager 504 that a UE-initiated handover is likely or has been started. In embodiments in which iRAT manager 504 and baseband logic 510 are not separate processing elements, this step may be replaced with the single processing element determining that the iRAT handover is likely or started. In some embodiments, this determination/notification is based on cellular metrics and/or Wi-Fi metrics determined by iRAT manager 504. For example, if a cellular connection is deteriorating and a Wi-Fi connection is strong, but one or more metrics have not met threshold levels for initiating a handover, iRAT manager 504 may determine that a handover is likely. Once one or more threshold levels of cellular and/or Wi-Fi metrics have been met, iRAT manager 504 may initiate a handover. In some embodiments, determining/notifying that a handover is likely may allow greater preference for UE-initiated handover relative to network-initiated handover.

At 1012, baseband logic 510 delays sending a measurement report to the network. In some embodiments, baseband logic 510 is configured to analyze the contents or type of the measurement report and delay sending it only if the report may cause the network to initiate a handover. In some embodiments, the delay may avoid a conflict or race condition between the UE-initiated handover and the network-initiated handover. "Delaying" in this context refers to waiting to perform an action even when an event or condition normally sufficient to trigger the action has occurred. For example, if the measurement report were periodic, delaying means waiting to send the measurement report even when the relevant period has elapsed. As another example, if the measurement report is event triggered, delaying means waiting to send the measurement report even when the triggering event has occurred.

Referring now to FIG. 10C, one embodiment of a method for resuming sending measurement report(s) is shown. At 1020, baseband logic 510 receives an indication that iRAT handover failed. In embodiments in which iRAT manager 504 and baseband logic 510 are not separate processing elements, this step may be replaced with the single processing element determining that the iRAT handover failed. The iRAT handover may fail for several reasons, in various embodiments. For example, there may be connectivity issues (e.g., the UE may not be able to establish IKEv2), the device may be unable to identify an IP address (e.g., of ePDG 530 due to DNS failure), and/or there may be capacity issues (e.g., ePDG 530 may reject the IKEv2 tunnel).

At 1022, baseband logic 510 resumes and sends the delayed measurement report to the network. This may trigger a network-initiated handover, in some embodiments. At this point, however, there will not be a race condition with the UE-initiated handover, because the UE-initiated handover has failed. In some embodiments, if the UE-initiated handover is successful, the measurement report may not be sent at all.

Figure 11A:
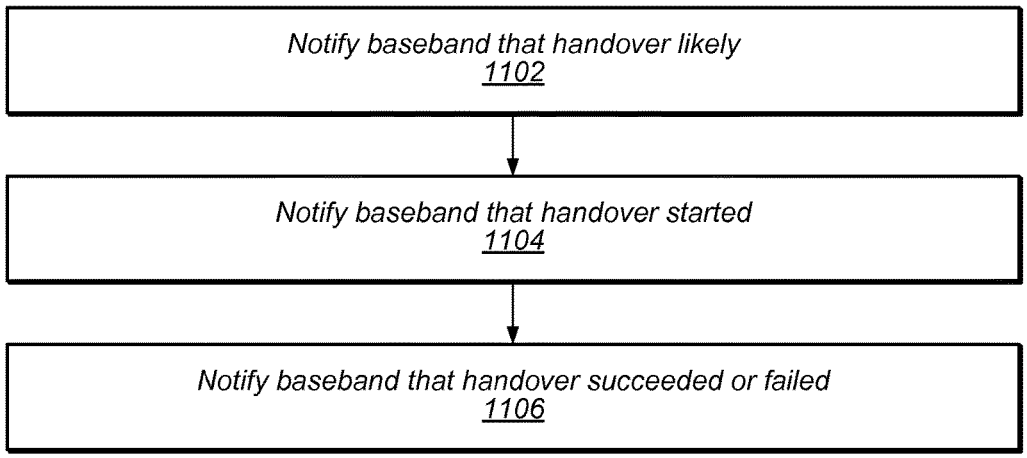
FIGS. 11A-11C illustrate exemplary methods performed by one embodiment of a inter-radio access technology manager.
Figure 11B:
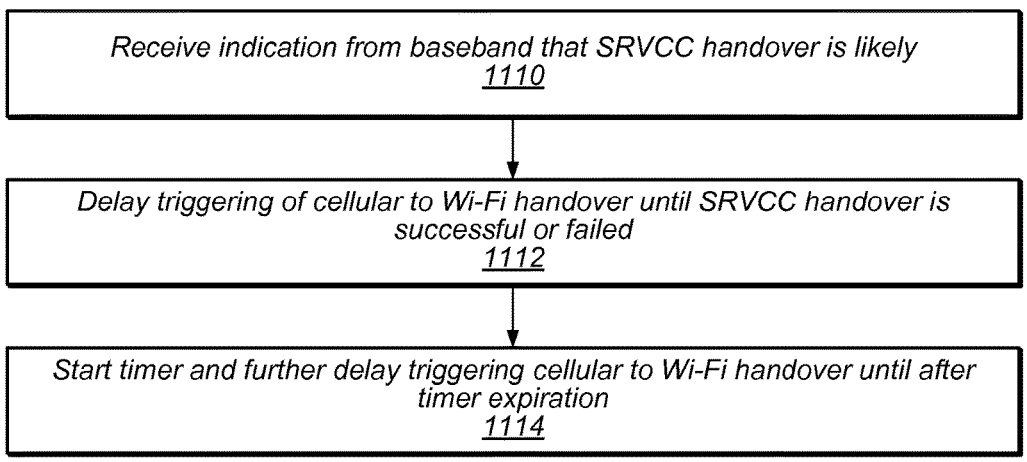
Figure 11C:
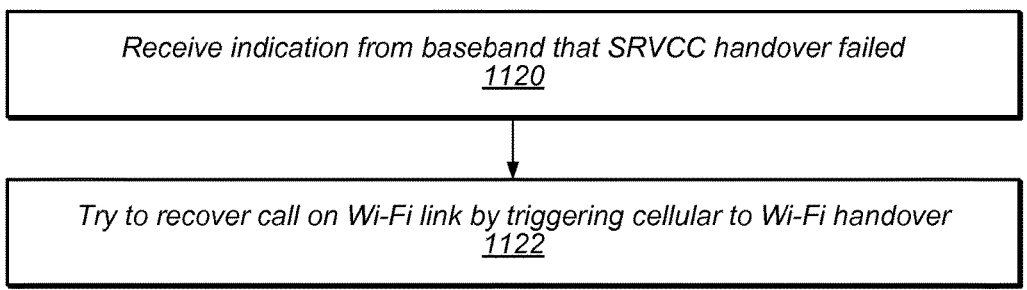

FIGS. 11A-C are flow diagrams illustrating exemplary embodiments of methods performed by iRAT manager 504. The methods shown in FIGS. 11A-C may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

Referring now to FIG. 11A, one embodiment of a method for sending notifications regarding a UE-initiated handover is shown. At 1102, iRAT manager 504 notifies baseband logic 510 that a handover is likely. As discussed above with reference to element 1010 of FIG. 10B, this determination may be based on one of more cellular metrics and/or one or more Wi-Fi metrics. In some embodiments, one or more thresholds for the metrics may be defined to trigger a notification that UE-initiated handover is likely, even though the actual handover has not yet been triggered.

At 1104, iRAT manager 504 notifies baseband logic 510 that a handover has started. As discussed above with reference to element 1010 of FIG. 10B, this determination may be based on one of more cellular metrics, one or more Wi-Fi metrics, and/or one or more thresholds or rules for triggering handover initiation.

At 1106, iRAT manager 504 notifies baseband logic 510 that a handover has succeeded or failed. If the handover succeeded, the communication may proceed via the target RAT of the handover (which may be, for example, Wi-Fi or another short-range RAT).

In embodiments in which iRAT manager 504 and baseband logic 510 are not separate processing elements, one or more of the elements of FIG. 11A may be replaced by determining steps performed by a single processing element.

Referring now to FIG. 11B, one embodiment of a method for avoiding a race condition is shown. At 1110, iRAT manager 504 receives an indication from baseband logic 510 that a network-initiated handover is likely. In embodiments in which iRAT manager 504 and baseband logic 510 are not separate processing elements, this step may be replaced with the single processing element determining that the network-initiated handover is likely or started. In some embodiments, this determination/notification is based on sending a measurement report to the network that is likely to cause a handover.

At 1112, iRAT manager 504 delays triggering a UE-initiated handover until the network-initiated handover has succeeded or failed. For example, even when one or more cellular and/or Wi-Fi metrics are such that iRAT manager 504 would normally trigger a handover, iRAT manager 504 waits to trigger the handover in some embodiments.

At 1114, iRAT manager 504 starts a timer and delays triggering the UE-initiated handover at least until the timer expires. In this embodiment, iRAT manager 504 may resume triggering UE-initiated handovers in response to either the network-initiated handover failing or the timer expiring. The timer may allow UE-initiated handovers to proceed when no information regarding success or failure of the SRVCC handover is received, which may occur if the SRVCC handover is never actually initiated, or connection with the network is lost, for example.

Referring now to FIG. 11C, one embodiment of a method for proceeding with a UE-initiated handover is shown. At 1120, iRAT manager 504 receives an indication that the network-initiated handover failed. In embodiments in which iRAT manager 504 and baseband logic 510 are not separate processing elements, this step may be replaced with the single processing element determining that the network-initiated handover failed.

At 1022, iRAT manager attempts to recover a deteriorating call by triggering cellular to Wi-Fi handover.

A given UE may implement delays for only UE-initiated handovers or for only network-initiated handovers in some embodiments. This may give preference to the other type of handover, in these embodiments. In other embodiments, the UE may implement delays for both types of handovers, but may be configurable to give preference to one type or the other. For example, in some situations (e.g., based on Wi-Fi metrics), it may be preferable to handover to Wi-Fi rather than to another cellular network, or vice versa.

Various examples described herein utilize cellular-to-Wi-Fi handovers as one example of UE-initiated handovers and PS to CS cellular handovers as one example of network-initiated handovers. However, these examples are included for exemplary purposes and are not intended to limit the scope of the present disclosure. In other embodiments, other types of UE-initiated handovers may be used (e.g., cellular to a short-range RAT other than Wi-Fi, short-range RAT to cellular, etc.) and/or other types of network-initiated handovers may be used (e.g., PS-PS, CS-PS, etc.).

Exemplary Method

Figure 12A:
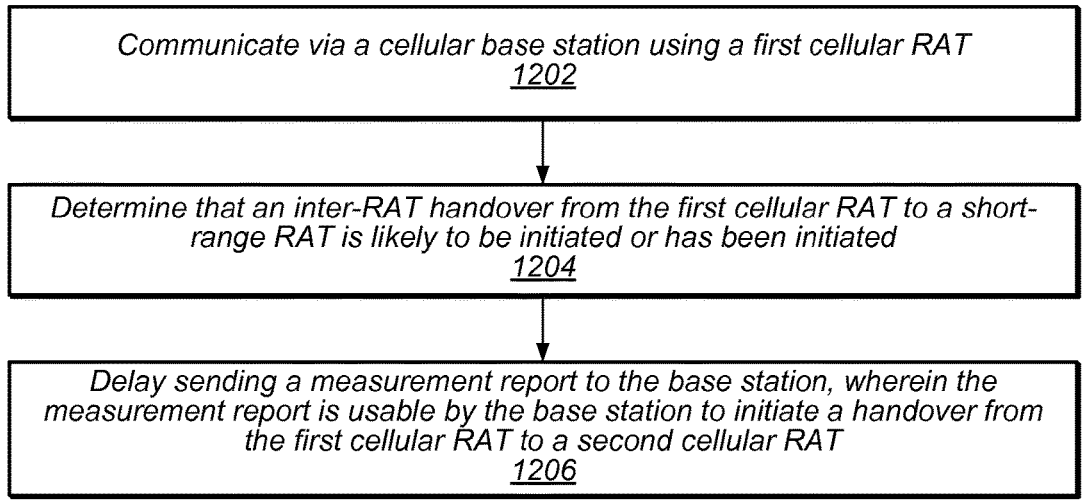
FIGS. 12A-12B illustrated exemplary embodiments of methods for avoiding conflict between UE-initiated and network-initiated handovers.

FIG. 12A is a flow diagram illustrating an exemplary embodiment of a method for avoiding handover conflicts. The method shown in FIG. 12A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 1202, UE 106 communicates with a cellular base station using a first cellular RAT. In one embodiment, the first cellular RAT uses VoLTE utilizing IMS and the communication is a voice communication.

At 1204, UE 106 determines that an inter-RAT handover from the first cellular RAT to a short-range RAT is likely to be initiated or has been initiated. In some embodiments, this determination is based on cellular and/or Wi-Fi metrics. In one embodiment, the short-range RAT is a Wi-Fi RAT.

At 1206, UE 106 delays sending a measurement report to the base station. In the illustrated embodiment, the measurement report is usable by the base station to initiate a handover from the first cellular RAT to a second cellular RAT. For example, if the measurement report includes information indicating that call quality may be compromised using the first cellular RAT, the base station (in combination with other network elements, in some embodiments) may determine that a handover to the second cellular RAT should be initiated. The delaying of element 1206 may avoid a conflict between a handover initiated by UE 106 and a handover initiated by the network.

Figure 12B:
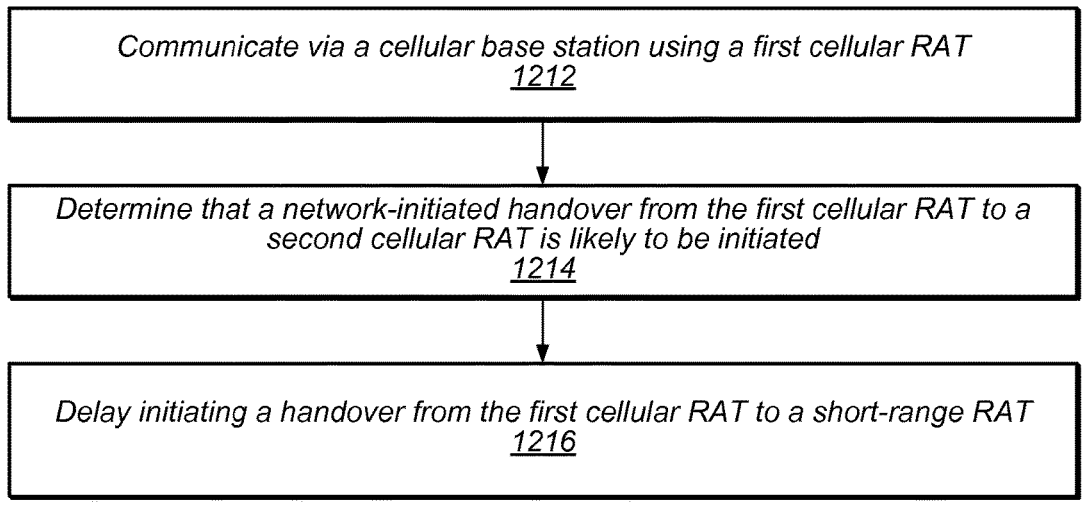

FIG. 12B is a flow diagram illustrating an exemplary embodiment of a method for avoiding handover conflicts. The method shown in FIG. 12B may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 1212, UE 106 communicates with a cellular base station using a first cellular RAT. In one embodiment, the first cellular RAT uses VoLTE utilizing IMS and the communication is a voice communication.

At 1214, UE 106 determines that a network-initiated handover from the first cellular RAT to a second cellular RAT is likely to be initiated. In some embodiments, this determination is made based on UE 106 sending a measurement report to the base station. In some embodiments, this determination is further based on the contents or type of the measurement report.

At 1216, UE 106 delays initiating a handover from the first cellular RAT to the short-range RAT. In one embodiment, UE 106 is configured to initiate the handover in response to the end of a particular time interval subsequent to the determining of element 1214 (e.g., based on a timer). In some embodiments, the delay of element 1216 may avoid conflict between the network-initiated handover and a handover initiated by UE 106.

Embodiments of the present disclosure may be realized in any of various forms. For example, various embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs. For example, some or all of the units included in the UE may be implemented as ASICs, FPGAs, or any other suitable hardware components or modules.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
at least one processor configured to couple to one or more first radios and a second radio in order to:
communicate using the one or more first radios, wherein the one or more first radios are configured to perform cellular communication with cellular base stations using different first and second cellular radio access technologies (RATs), wherein the apparatus is configured to handover from the first cellular RAT to the second cellular RAT in response to control signaling received from one of the cellular base stations, wherein initiation of the handover is based on a measurement report from the apparatus;
communicate using the second radio configured to perform wireless communication using a short-range RAT, wherein the apparatus is configured to determine when to initiate handovers of the apparatus from one of the first and second cellular RATs and the short-range RAT; and
while communicating using the first cellular RAT, in response to determining that an inter-RAT handover to the short-range RAT is likely to be initiated or has been initiated by the at least one processor, delay sending a measurement report to one of the cellular base stations, wherein delay in sending the measurement report prevents the cellular base station from initiating a handover of the apparatus from the first cellular RAT to the second cellular RAT.

2. The apparatus of claim 1, wherein the first cellular RAT is a packet-switched RAT and the second cellular RAT is a circuit-switched RAT.

3. The apparatus of claim 1, wherein the short-range RAT is a Wi-Fi RAT.

4. The apparatus of claim 1, wherein the communicating using the first cellular RAT uses voice over long term evolution (VoLTE) utilizing internet protocol multimedia subsystem (IMS).

5. The apparatus of claim 1, wherein the at least one processor is configured to determine that the inter-RAT handover to the short-range RAT is likely based on one or more metrics for the first cellular RAT and one or more metrics for the short-range RAT.

6. The apparatus of claim 1, wherein the at least one processor is configured to initiate the handover to the short-range RAT based on one or more metrics for the first cellular RAT and one or more metrics for the short-range RAT.

7. The apparatus of claim 1, wherein the apparatus is further configured to, while communicating using the first cellular RAT, in response to determining that a handover to the second cellular RAT is likely to be initiated or has been initiated by a network that includes the cellular base station, delay triggering a handover to the short-range RAT.

8. The apparatus of claim 1, wherein the apparatus is configured to delay the measurement report when an event sufficient to trigger transmission of the measurement report has occurred.

9. An apparatus, comprising:
at least one processor configured to couple to one or more first radios and a second radio in order to:
communicate using the one or more first radios, wherein the one or more first radios are configured to perform cellular communication with cellular base stations using different first and second cellular radio access technologies (RATs), wherein the apparatus is configured to handover from the first cellular RAT to the second cellular RAT in response to control signaling received from one of the cellular base stations, wherein initiation of the handover is based on a measurement report from the apparatus;

communicate using the second radio configured to perform wireless communication using a short-range RAT, wherein the apparatus is configured to determine when to initiate handovers of the apparatus from one of the first and second cellular RATs and the short-range RAT; and while communicating using the first cellular RAT, in response to determining that a handover to the second cellular RAT is likely to be initiated or has been initiated by a network that includes the cellular base station, delay triggering a handover of the apparatus to the short-range RAT.

10. The apparatus of claim 9,
wherein the first cellular RAT is a packet-switched RAT and the second cellular RAT is a circuit-switched RAT; and
wherein the short-range RAT is a Wi-Fi RAT.

11. The apparatus of claim 9, wherein the apparatus is further configured to:
resume triggering the handover to the short-range RAT in response to an end of a particular time interval subsequent to determining that the handover to the second cellular RAT is likely to be initiated or has been initiated by the network.

12. The apparatus of claim 9, wherein the at least one processor is configured to determine that handover to the second cellular RAT is likely to be initiated in response to the apparatus sending a measurement report to the cellular base station, wherein the measurement report is usable by the cellular base station to initiate a handover from the first cellular RAT to the second cellular RAT.

13. The apparatus of claim 12, wherein the measurement report specifies one or more metrics regarding the communicating using the first cellular RAT.

14. The apparatus of claim 9, wherein the at least one processor is configured to determine that handover to the second cellular RAT has been initiated in response to receiving a handover command from the cellular base station.

15. A non-transitory computer-readable medium having instructions stored thereon that are executable by a computing device to perform operations comprising:
communicating via a cellular base station using a first cellular radio access technology (RAT), wherein the computing device is configured to handover from the first cellular RAT to the second cellular RAT in response to control signaling received from one of the cellular base stations, wherein initiation of the handover is based on a measurement report from the apparatus;

determining that an inter-RAT handover from the first cellular RAT to a short-range RAT is likely to be initiated or has been initiated, wherein the computing device is configured to determine when to initiate handovers of the computing device from one of the first and second cellular RATs and the short-range RAT; and in response to the determining, delaying sending a measurement report to the cellular base station, wherein delay in sending the measurement report prevents the cellular base station from initiating a handover of the computing device from the first cellular RAT to the second cellular RAT.

16. The non-transitory computer-readable medium of claim 15, wherein the first cellular RAT is a packet-switched RAT and the second cellular RAT is a circuit-switched RAT.

17. The non-transitory computer-readable medium of claim 15, wherein the short-range RAT is a Wi-Fi RAT.

18. The non-transitory computer-readable medium of claim 15, wherein the operations further comprise determining that the inter-RAT handover to the short-range RAT is likely or initiating the inter-RAT handover based on one or more metrics for the first cellular RAT and one or more metrics for the short-range RAT.

19. The non-transitory computer-readable medium of claim 15, wherein the operations further comprise:
while communicating using the first cellular RAT, in response to determining that a handover to the second cellular RAT is likely to be initiated or has been initiated by a network that includes the cellular base station, delaying triggering a handover to the short-range RAT.

20. The non-transitory computer-readable medium of claim 15, wherein the operations further comprise determining that the inter-RAT handover to the short-range RAT is likely or initiating the inter-RAT handover based on reduced signal strength for the first cellular RAT and increased signal strength for the short-range RAT.

* * * * *